(12) United States Patent
Miles

(10) Patent No.: US 7,555,595 B2
(45) Date of Patent: Jun. 30, 2009

(54) METHODS AND APPARATUS FOR WRITING SERVO FRAMES TO AND/OR VERIFYING DATA AREAS OF A STORAGE MEDIUM

(75) Inventor: Michael Alan Miles, Hayling Island (GB)

(73) Assignee: Xyratex Technology Limited, Havant (GB)

( * ) Notice: Subject to any disclaimer, the term of this patent is extended or adjusted under 35 U.S.C. 154(b) by 256 days.

(21) Appl. No.: 10/759,184

(22) Filed: Jan. 20, 2004

(65) Prior Publication Data

US 2004/0145825 A1 Jul. 29, 2004

Related U.S. Application Data

(60) Provisional application No. 60/442,156, filed on Jan. 24, 2003.

(51) Int. Cl.
*G06F 13/00* (2006.01)
(52) U.S. Cl. .................. 711/112; 711/157; 360/31; 360/75
(58) Field of Classification Search ............... 360/31, 360/75; 711/112, 157
See application file for complete search history.

(56) References Cited

U.S. PATENT DOCUMENTS

| 2003/0002190 A1* | 1/2003 | Teo et al. .................. 360/63 |
| 2003/0123172 A1* | 7/2003 | Zhu et al. .................. 360/31 |

* cited by examiner

*Primary Examiner*—Sanjiv Shah
*Assistant Examiner*—Jae U Yu
(74) *Attorney, Agent, or Firm*—Pillsbury Winthrop Shaw Pittman, LLP

(57) ABSTRACT

Methods and apparatus are disclosed for writing and verifying servo frames written on a storage medium, for verifying data areas of a storage medium, and for writing and verifying servo frames and data areas of a storage medium. In one example, the writing of at least a portion of a position field of a servo frame to a track of the storage medium is interleaved with reading of at least a portion of a previously written logic field of a servo frame of a track of the storage medium whereby said portion of the previously written logic field can be verified during the servo writing process.

22 Claims, 2 Drawing Sheets

METHODS AND APPARATUS FOR WRITING SERVO FRAMES TO AND/OR VERIFYING DATA AREAS OF A STORAGE MEDIUM This application claims priority to U.S. provisional application No. 60/442,156, filed Jan. 24, 2003, the entire content of which is hereby incorporated by reference.

BACKGROUND OF THE INVENTION

1. Field of the Invention

The present invention relates in one aspect to methods and an apparatus for writing and verifying servo frames written on a storage medium. In another aspect, the present invention relates to methods and apparatus for verifying data areas of a storage medium. In yet another aspect, the present invention relates to methods and apparatus for writing and verifying servo frames and data areas of a storage medium.

2. Description of the Related Art

Information for systems such as data processing systems is typically stored on storage media. Particular use is made of storage disks such as magnetic disks, opto-magnetic disks, and the like. One type of magnetic disk arrangement is a so-called "head disk assembly" which is intended normally to be permanently fixed in a data processing system; the head disk assembly includes one or more magnetic disks and the associated "product" head or heads having read and write elements which read data from and write data to the disk. Another type of magnetic disk arrangement is of a type known as "removable media" which normally consists of a magnetic disk medium in a protective plastics case and which can be used to transfer data between data processing systems by physical transfer of the disk itself from one machine to another.

In a known method of manufacturing storage media such as hard disk drives, a head disk assembly consisting of the product head(s), the disk or disks, the motor and arm electronics, is mounted in a mastering station known as a servo-writer. The servo-writer causes the write element of the product head to write plural servo frames around each track on the disk. The servo frames provide the master reference that is used by the disk drive during normal operation in order to locate the tracks and sectors on the disk for data storage and retrieval. Clearly, the servo frames have to be accurately written to the disk at very well defined positions. Currently, it takes over 35 minutes to write the complete set of servo frames to a typical disk.

It is of course desirable to be able to verify at least some if not all of the servo frames. However, at present, this can only be done after the servo track writing process is completed, for the reasons discussed below.

The product write element has to have a width that is less than the pitch (i.e. the width) of the tracks of the disk so that the product write element when in use by an end user only writes data to a single track and does not overwrite data on adjacent tracks. Typically, the width of the write element is about 70% to 80% of the track pitch. This means that during the conventional servo track writing process described above, the servo frames have to be written in two passes for each track. More specifically and starting at say the outside diameter of the disk, a first (outer) half of the servo frames are written on a first pass over the track, the product write element is moved inwards half a track, and the second (inner) half of the servo frames are written in a second pass over the track. Accordingly, given that the product write element is effectively writing the whole time that it is passing over locations of the servo frames on the tracks of the disk, the servo frames can only be verified after all of the servo frames have been written to the disk. In practice, such verification is not carried out, or is only carried out to a limited degree by verifying a sample of the servo frames, because of the time that would be taken following the conventional servo track writing process.

For both cost and performance benefits, there is a trend towards use of a so-called media level servo track writer to write the servo tracks to storage media, such as disks. The media level writer writes the servo frames prior to the disk being incorporated in a hard disk drive. The media level writer thus has its own head having at least a write element for writing the servo tracks to the disk in place of the product write element that is used in the conventional servo track writing process described above. A media level writer typically has a gang of heads for writing to plural disks simultaneously but could be a single head disk combination.

It is desirable to carry out a so-called media certification of the disk, i.e. to check the data areas of the disk for defects, such as surface defects, substrate defects, mechanical scratches, etc. At present, this is carried out on a separate media certification machine prior to the servo writing process and, in a typical example, takes an additional 15 minutes or so to check the whole of the data areas. Bearing in mind that the disk has to be physically moved from the media certifier to the servo track or media level writer, a complete media certification process would add some 50% to the processing time required to prepare the disk. This is obviously undesirable. Time savings can be made by checking only a sample of the data areas, but ideally the whole of the data area is checked.

SUMMARY OF THE INVENTION

According to a first aspect of the present invention, there is provided a method of writing servo frames to tracks of a storage medium using a head having at least a write element, each servo frame including a position field that is used to position a read element of the storage medium over the tracks and a logic field that provides a timing reference for the servo frame, the method comprising:

interleaving the writing of the at least a portion of a position field of a servo frame to a track of a storage medium with reading of at least a portion of a previously written logic field of a servo frame of a track of the storage medium whereby said portion of the previously written logic field can be verified during the servo writing process.

This interleaving allows the logic fields to be verified (i.e. checked) on-the-fly during the servo writing process, without any additional processing time being required. Other advantages, such as reduced heat build-up and better integrity of the logic fields, can arise, depending on the precise implementation in a practical product. The term "verification" as used herein will be discussed further below.

In a preferred embodiment, said previously written logic field is written in a first pass of the head over the storage medium and is read in a second pass of the head over the storage medium. In a preferred embodiment, a first portion of said position field is written in said first pass of the head over the storage medium and a second portion of said position field is written in said second pass of the head over the storage medium.

Preferably, at least a portion of the logic fields of the servo frames of all tracks in a user data area of the storage medium are read during the servo writing process to allow said portions to be verified. The user data area is that portion of the storage medium where user data is stored, and is typically delimited by guard bands. It is only necessary to verify the logic fields within this region. It will be understood, however, that perhaps only some of the logic fields need be read and verified.

The method preferably comprises reading a position field of a servo frame of a track during the servo writing process. In this embodiment, both the logic field and the position field of the servo frame can be read, again with no time penalty. The position field can be "verified", which term is again discussed further herein.

In a preferred embodiment, the position field is demodulated to provide a position error signal that is used to control the movement of the head. This can be of significant advantage in that it allows more accurate tracks to be formed on the storage medium, allowing the possibility of increasing the performance and hence the useful life of the media level writer or other device writing the servo frames.

Preferably, the position fields of at least all tracks in a user data area of the storage medium are read during the servo writing process.

According to a second aspect of the present invention, there is provided apparatus for writing servo frames to tracks of a storage medium, each servo frame including a position field that is used to position a read element of the storage medium over the tracks and a logic field that provides a timing reference for the servo frame, the apparatus comprising:

a head having at least a write element and a read element that are offset from each other, the write element having a width that is greater than the pitch of the tracks on a said storage medium;

the apparatus being arranged such that the writing of at least a portion of the position fields of a servo frame to a track of a storage medium using the write element is interleaved with reading of at least a portion of a previously written logic field of a servo frame of a track of the storage medium using the read element whereby said portion of the previously written logic field can be verified during the servo writing process.

The apparatus may be arranged such that said previously written logic field is written in a first pass of the head over the storage medium and is read in a second pass of the head over the storage medium. The apparatus may further be arranged such that a first portion of said position field is written in said first pass of the head over the storage medium and a second portion of said position field is written in said second pass of the head over the storage medium.

The apparatus is preferably arranged such that at least a portion of the logic fields of the servo frames of all tracks in a user data area of the storage medium are read during the servo writing process to allow said portions to be verified.

The apparatus is preferably arranged such that a position field of a servo frame of a track is read during the servo writing process. The apparatus is most preferably arranged such that the position field is demodulated to provide a position error signal that is used to control the movement of the head. Preferably, the apparatus is arranged such that the position fields of at least all tracks in a user data area of the storage medium are read during the servo writing process.

According to a third aspect of the present invention, there is provided a method of writing servo frames to tracks of a storage medium using a write element of a head, each servo frame including a position field that is used to position a read element of the storage medium over the tracks and a logic field that provides a timing reference for the servo frame, the position field having at least a first portion and a second portion that is spaced laterally of the track from the first portion, the method comprising:

(A) positioning the write element over substantially the whole of a track on the storage medium;

(B) writing a complete full width logic field of a servo frame to said track with the write element;

(C) writing a first portion of the position field of said servo frame to a first part of said track with the write element;

(D) moving the write element relative to the storage medium such that a second portion of said position field of said servo frame of said track can be written at a position that is at least spaced laterally of the track from said first portion;

(E) during the movement in step (D), reading at least a portion of at least one of (i) said logic field of said servo frame of said track and (ii) a logic field of a servo frame of another track, in order to allow said portion of the logic field to be verified;

(F) writing said second portion of said position field of said servo frame of said track at a position that is at least spaced laterally of the track from said first portion with the write element; and, (G) repeating steps (A) to (F) as required for subsequent tracks on the storage medium.

In general, as is known in servo writing per se, the position field of a servo frame is written in two passes. Various types of position field are known, as discussed briefly further herein. This aspect again allows the logic fields to be verified (i.e. checked) on-the-fly during the servo writing process, without any additional processing time being required.

Preferably, step (D) comprises moving the write element relative to the storage medium both laterally of the track and longitudinally of the track, and wherein the reading in step (E) takes place during said longitudinal movement.

Preferably, the method comprises repeating steps (B) and (C) as required for further servo frames of said track prior to carrying out step (D) and then repeating steps (D) to (F) as required for said further servo frames.

Preferably, the method comprises carrying out steps (A) to (G) for at least all tracks in a user data area of the storage medium. Again, typically, the user data area is that portion of the storage medium that is contained within guard bands. It is only necessary to verify the logic fields within this region. Again, it may not be necessary to read and verify strictly all logic fields and a sample may be sufficient.

The method preferably comprises reading a position field of a servo frame of another track whilst moving the write element in step (D). The position field is preferably demodulated to provide a position error signal that is used to control the movement of the head. Most preferably, the position fields of at least all tracks in a user data area of the storage medium are read.

According to a fourth aspect of the present invention, there is provided apparatus for writing servo frames to tracks of a storage medium, each servo frame including a position field that is used to position a read element of the storage medium over the tracks and a logic field that provides a timing reference for the servo frame, the position field having at least a first portion and a second portion that is spaced laterally of the track from the first portion, the apparatus comprising:

a multi-element head having at least one write element and at least one read element that are offset from each other, the write element having a width that is greater than the pitch of the tracks on a said storage medium;

the apparatus being arranged such that the write element can be positioned over substantially the whole of a track on the storage medium; such that a complete full width logic field of a servo frame can be written to said track with the write element; such that a first portion of the position field of said servo frame can be written to a first part of said track with the write element; such that the write element can be moved relative to the storage medium such that a second portion of said position field of said servo frame of said track can be written at a position that is at least spaced laterally of the track from said first portion; such that, during the movement of the write element as aforesaid, a portion of at least one of (i) said logic field of said servo frame of said track and (ii) a logic field of a servo frame of another track can be read by the read element, in order to allow said portion of the logic field to be verified; and such that said second portion of said position field of said servo frame of said track can be written at a position that is at least spaced laterally of the track from said first portion with the write element.

The apparatus is preferably arranged such that during said movement, the write element moves relative to the storage medium both laterally of the track and longitudinally of the track, and such that said reading of said logic field takes place during said longitudinal movement.

The apparatus is preferably arranged such that a position field of a servo frame of a track is read during the servo writing process. The apparatus is preferably arranged such that the position field is demodulated to provide a position error signal that is used to control the movement of the head. Preferably, the apparatus is arranged such that the position fields of at least all tracks in a user data area of the storage medium are read during the servo writing process.

According to a fifth aspect of the present invention, there is provided a method of writing servo frames to tracks of a storage medium using a write element, each servo frame including a position field that is used to position a read element of the storage medium over the tracks, the method comprising:
- (A) writing a first portion of a position field of a servo frame to a first part of a first track with the write element;
- (B) moving the write element relative to the storage medium such that a second portion of said position field of said servo frame of said first track can be written at a position that is at least spaced laterally of the track from said first portion;
- (C) during the movement in step (B), reading a position field of a servo frame of a second track;
- (D) writing a second portion of said position field of said servo frame of said first track at a position that is at least spaced laterally of the track from said first portion with the write element; and,
- (E) repeating steps (A) to (D) as required for further tracks on the storage medium.

In this aspect, only the position field(s) are read, without checking of the logic field(s). This can be used not only to verify the position field(s) as such, but can also be used to provide an indication of the mechanical stability of the apparatus used to carry out the servo writing process.

Preferably step (B) comprises moving the write element relative to the storage medium both laterally of the track and longitudinally of the track, the reading in step (C) taking place during said longitudinal movement.

Preferably, step (A) is repeated as required for further servo frames of said first track prior to carrying out step (B) and then steps (B) and (D) are repeated as required for said further servo frames of said track.

Steps (A) to (E) are preferably carried out for at least all tracks in a user data area of the storage medium.

The position field is preferably demodulated to provide a position error signal that is used to control the movement of the head. Again, this can improve the accuracy of the writing of the servo frames.

According to a sixth aspect of the present invention, there is provided apparatus for writing servo frames to tracks of a storage medium, each servo frame including a position field that is used to position a read element of the storage medium over the tracks, the apparatus comprising:

a multi-element head having at least one write element and at least one read element that are offset from each other, the write element having a width that is greater than the pitch of the tracks on a said storage medium;

the apparatus being arranged such that a first portion of a position field of a servo frame is written to a first part of a first track with the write element; such that the write element can be moved relative to the storage medium such that a second portion of said position field of said servo frame of said first track can be written at a position that is at least spaced laterally of the track from said first portion; such that during the movement as aforesaid, a position field of a servo frame of a second track is read using the read element; and such that a second portion of said position field of said servo frame of said first track is written with the write element at a position that is at least spaced laterally of the track from said first portion.

The apparatus is preferably arranged such that during said movement, the write element moves relative to the storage medium both laterally of the track and longitudinally of the track, and wherein said reading of said logic field takes place during said longitudinal movement.

The apparatus is preferably arranged such that the position field is demodulated to provide a position error signal that is used to control the movement of the head.

According to a seventh aspect of the present invention, there is provided a method of verifying data areas of tracks of a storage medium using a write element and a read element, the method comprising:
- (A) positioning the write element over substantially the whole of a track on the storage medium;
- (B) writing a certification pattern to a data area of said track with the write element;
- (C) repositioning the write element;
- (D) reading at least a portion of said certification pattern using the read element in order to allow the integrity of said data area to be checked; and,
- (E) repeating steps (A) to (D) as required for subsequent tracks on the storage medium.

The write element in practice may be repositioned so as to be able to write other data, such as, for example, position fields or logic fields of servo frames on the storage medium or a certification pattern to another data area on the storage medium. In this aspect, in a preferred embodiment, the data area(s) can be certified during the servo writing process without any time penalty, which has not previously been possible.

The method preferably comprises repeating step (B) for plural data areas of said track prior to carrying out step (C), and in step (D) reading at least a portion of the certification patterns written to said track in order to allow the integrity of said data areas to be checked.

According to an eighth aspect of the present invention, there is provided for verifying data areas of tracks of a storage medium, the apparatus comprising:

a write element and a read element that are offset from each other, the write element having a width that is greater than the pitch of the tracks on a said storage medium;

the apparatus being arranged such that the write element can be positioned over substantially the whole of a track on the storage medium; such that a certification pattern is written to a data area of said track with the write element; and such that the write element can be repositioned such that at least a portion of said certification pattern is read using the read element in order to allow the integrity of said data area to be checked.

According to a ninth aspect of the present invention, there is provided a method of writing servo frames to and verifying data areas of tracks of a storage medium using a write element and a read element of a head, each servo frame including a position field that is used to position a read element of the storage medium over the tracks and a logic field that provides a timing reference for the servo frame, the method comprising:

(A) positioning the write element over substantially the whole of a track on the storage medium;
(B) writing a complete full width logic field of a servo frame to said track with the write element;
(C) writing a first portion of the position field of said servo frame to said track with the write element;
(D) writing a certification pattern to a data area of said track with the write element;
(E) moving the write element relative to the storage medium to a position over said track such that a second portion of said position field of said servo frame of said track can be written at a position that is at least spaced laterally of the track from said first portion;
(F) during the movement in step (E), reading a portion of at least one of (i) said logic field of said servo frame of said track and (ii) a logic field of a servo frame of another track, in order to allow said portion of the logic field to be verified;
(G) writing said second portion of said position field of said servo frame of said track at a position that is at least spaced laterally of the track from said first position with the write element;
(H) reading at least a portion of said certification pattern using the read element in order to allow the integrity of said data area to be checked; and,
(I) repeating steps (A) to (H) as required for subsequent tracks on the storage medium.

In an embodiment, said previously written logic field is written in a first pass of the head over the storage medium and is read in a second pass of the head over the storage medium. A first portion of said position field may be written in said first pass of the head over the storage medium and a second portion of said position field may be written in said second pass of the head over the storage medium.

In an embodiment, at least a portion of the logic fields of the servo frames of all tracks in a user data area of the storage medium are read during the servo writing process to allow said portions to be verified.

Preferably, the method comprises reading a position field of a servo frame of a track during the servo writing process. The position field is preferably demodulated to provide a position error signal that is used to control the movement of the head. In an embodiment, the position fields of at least all tracks in a user data area of the storage medium are read during the servo writing process.

According to a tenth aspect of the present invention, there is provided apparatus for writing servo frames to and verifying data areas of tracks of a storage medium, each servo frame including a position field that is used to position a read element of the storage medium over the tracks and a logic field that provides a timing reference for the servo frame, the apparatus comprising:

a multi-element head having at least one write element and at least one read element that are offset from each other, the write element having a width that is greater than the pitch of the tracks on a said storage medium;

the apparatus being arranged such that the write element can be positioned over substantially the whole of a track on the storage medium; such that a complete full width logic field of a servo frame is written to said track with the write element; such that a first portion of the position field of said servo frame is written to said track with the write element; such that a certification pattern is written to a data area of said track with the write element; such that the write element can be moved relative to the storage medium to a position over said track such that a second portion of said position field of said servo frame of said track can be written at a position that is at least spaced laterally of the track from said first portion; such that during the movement as aforesaid, a portion of at least one of (i) said logic field of said servo frame of said track and (ii) a logic field of a servo frame of another track can be read by the read element, in order to allow said portion of the logic field to be verified; such that said second portion of said position field of said servo frame of said track is written at a position that is at least spaced laterally of the track from said first position with the write element; and such that at least a portion of said certification pattern is read using the read element in order to allow the integrity of said data area to be checked.

The apparatus is preferably arranged such that a position field of a servo frame of a track is read during the servo writing process. The apparatus is preferably arranged such that the position field is demodulated to provide a position error signal that is used to control the movement of the head.

According to an eleventh aspect of the present invention, there is provided apparatus for writing servo frames to tracks of a storage medium, each servo frame including a position field that is used to position a read element of the storage medium over the tracks and a logic field that provides a timing reference for the servo frame, the apparatus comprising:

a head having at least one write element and at least one read element, the write element having a width that is equal to or greater than the pitch of the tracks of a said storage medium, the read and write elements being offset from each other by an offset and being separated by a separation that allow the read element to read at least part of a previously written logic field of a servo frame of a track of the storage medium whilst the write element is moving towards the position where it writes at least a portion of a position field of a servo frame of another track of the storage medium.

By virtue of the write element being (at least) the full width of a track, the write element can write a complete full width logic field to a servo frame of a track of the storage medium. The separation between the read and write elements is longitudinal and the offset is lateral.

The read element preferably has a width that is substantially equal to the pitch of the tracks of a said storage medium. This enables servo verification and data certification in accordance with the most preferred embodiment.

Preferably, the separation between the read and write elements is such that the read element can read the entire previously written logic field of a servo frame of a track of the storage medium whilst the write element is moving towards the position where it writes at least a portion of a position field of a servo frame of another track of the storage medium.

According to a twelfth aspect of the present invention, there is provided apparatus for writing servo frames to tracks of a storage medium, each servo frame including a position field that is used to position a read element of the storage medium over the tracks, the apparatus comprising:

a data head having at least one write element and at least one read element, the read and write elements being offset from each other by an offset and being separated by a separation that allow the read element to read at least part of a previously written position field of a servo frame of a track of the storage medium whilst the write element is moving towards the position where it writes at least a portion of a position field of a servo frame of another track of the storage medium.

As will be understood by those skilled in the art, in a typical hard disk drive, the width of the read element is typically 60-70% of the width of the write element, requiring that the position fields be written at least every half track pitch ($T_P$). Again as will be understood by those skilled in the art, there are many different methods of writing this positional information, such as bi-phase, quadrature null phase bursts, and writing at either one or half track widths.

Many references have been made to verifying or the verification of various portions of the written data. The term "verification" or similar as used herein is to be taken to include at least pattern recognition, position demodulation, amplitude grading, timing recovery and certification. Which of these is relevant will depend on the purpose for which the data is being read, as will be well understood by a person skilled in the art.

In the various methods described above, the steps are not necessarily carried out in the order in which they are described. For example, in an embodiment, a logic field of a servo frame may be written in time before of after a position field of the servo frame.

BRIEF DESCRIPTION OF THE DRAWINGS

Embodiments of the present invention will now be described with reference to the accompanying drawings, in which.

DETAILED DESCRIPTION

Figure 1:
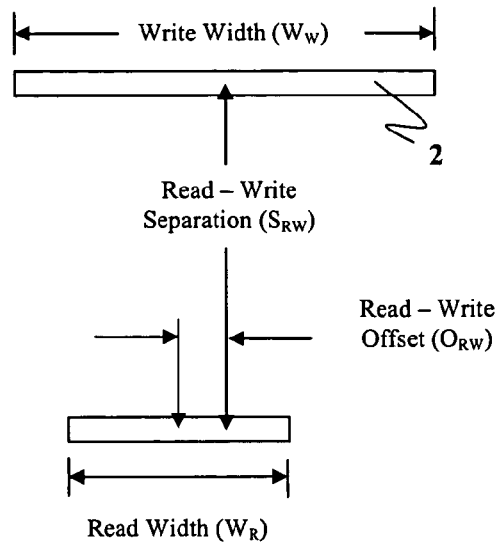
FIG. 1 is a schematic representation of one head containing separate read and write elements of a media level writer.

Referring first to FIG. 1, a read element 1 and a write element 2 of a typical magneto resistive head (MR, GMR, TMR, etc.) are shown. The read element 1 has a width $W_R$ and the write element 2 has a width $W_W$. The read and write elements 1,2 are separated by a separation $S_{RW}$. The centres of the read and write elements 1,2 are offset from each other by an offset $O_{RW}$.

Figure 2:
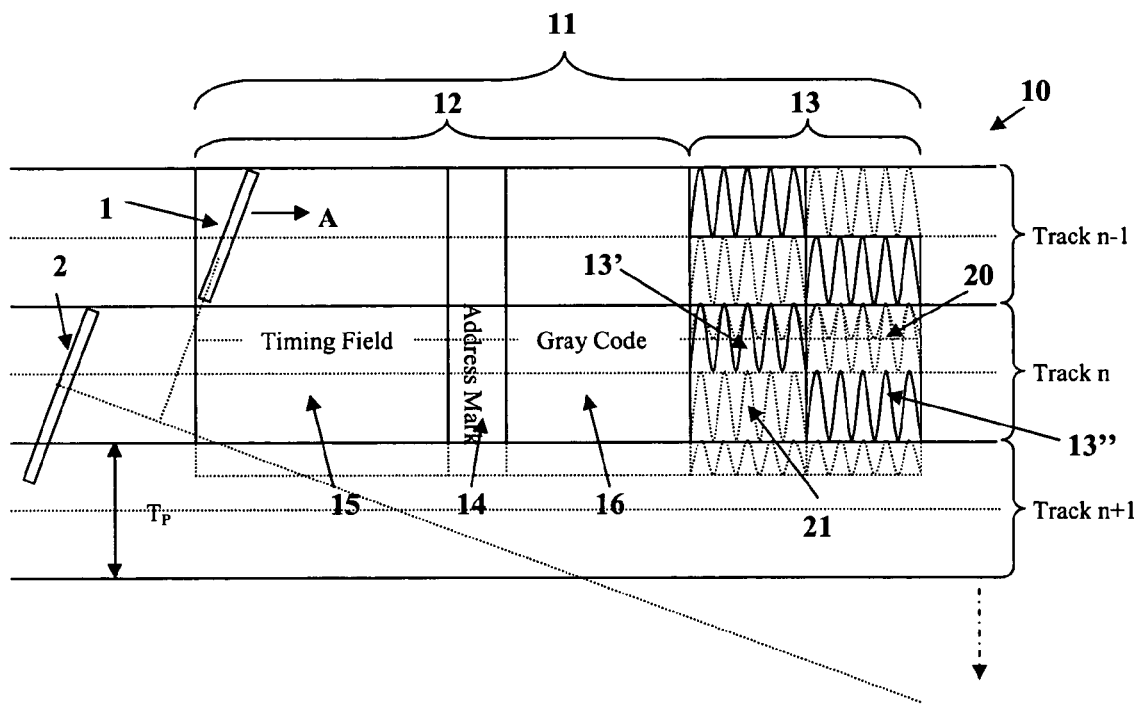
FIG. 2 is a schematic representation of an example of the writing of servo frames to tracks of a storage medium in accordance with an embodiment of the present invention.

Referring to FIG. 2, there is shown schematically the read and write elements 1,2 moving in a direction A relative to a storage medium 10. The storage medium 10 has plural tracks n, n+1, . . . . It will be appreciated that the movement A of the read and write elements 1,2 is only relative to the storage medium 10. In practice, the read and write elements 1,2 may be relatively stationary (save for movement laterally across tracks) and the storage medium 10 moved in relation thereto. The storage medium 10 may be a magnetic disk that is ultimately incorporated in a product, such as a hard disk drive, for use by an end user. Much of the present specification is written in terms of preparing the storage medium for use in a hard disk drive, though it will be appreciated that there are other applications for the storage medium. Similarly, whilst much of the present specification is written in terms of disks, other storage media that require servo frames for positioning may be used.

A servo frame 11 for one track is schematically shown. The servo frame has two distinct portions, a logic field 12 and a position field 13. The precise structure of the position field 13 is unimportant and can be for example quadrature, bi-phase, or phase encoded, as well as full track and half track bursts, which will be well known to persons skilled in the art. The significant point is that in practice, the read element of for example a hard disk drive is preferably smaller than the write element of the hard disk drive in order to ensure that the read element is entirely within the data written by the write element. Bearing in mind that the write element of the hard disk drive is preferably smaller than the track pitch as discussed above, this means that the read element of a typical hard disk drive typically has a width that is 50 to 75% of the track pitch. This in turn means that the position field 13 of a servo frame 11 of a track has to be written in (at least) two passes in order to ensure that a linear response is provided in the analogue position error signal obtained from the position field 13. In this example the position field 13 is divided into a first position field 13' formed in the first (uppermost in FIG. 2) half of the track and a second (lowermost in FIG. 2) position field 13" in the second half of the track.

The logic field 12 extends across substantially the whole of the track width, again to allow the logic fields to be coherent radially so that, at any radial position, the logical track position can be accurately decoded. The logic field 12 includes at least an address mark 14 that provides a unique timing reference for the servo frame 11 and that sets the absolute timing for the servo frame 11. Preferably, the logic field 11 also includes a timing field 15 which is used to lock a phase locked loop of the servo mechanism of the hard disk drive when in use by an end user. The logic field 11 also preferably includes a gray code field 16 which is used to provide a track address when the hard disk drive is used by an end user. The address mark 14 can be used to generate timing windows to read the gray code 16. In known servo pattern verification, for at least some of the servo frames, at least the address mark 14 is read in order to ensure that it has been validly written. Where provided, the timing field 15 and the gray code 16 are also preferably read in order to ensure that they have been validly written, again for at least some of the servo frames.

Referring still to FIG. 2, a description will now be given of an example of a method according to an embodiment of the present invention. The width $W_W$ of the write element 2 is at least substantially equal to the track pitch $T_P$ and is preferably greater than the track pitch $T_P$.

Having been used to write servo frames to previous tracks (i.e. tracks n−1 and earlier) in the manner described below, the write element 2 is positioned so as to overlie substantially the whole of track n, with an edge (the uppermost edge in FIG. 2) of the write element 2 substantially coincident with the boundary between tracks n−1 and n. Because of the relatively large width $W_W$ of the write element 2, as can be seen the write element 2 overlies a portion of the next track n+1. The entire logic field 12 for a servo frame 11 on the track n is written across the whole width of the track n. In the example shown, the timing field 15 is first written, followed by the address mark 14 and then the gray code 16. Because of the large width of the write element 2, the logic field 12 just written is also written over the adjacent portion of the following track n+1.

In this example, the position field 13 is of the bi-phase type. Other types of position field are well known to persons skilled in the art.

Thus, the first position field 13' of the servo frame 11 is then written. Again, because of the width of the write element 2, this means that the burst is written over the whole width of the track n and also overlaps onto the following track n+1.

The write element 2 then moves onto the next portion of the track n. Now, when the previous track n−1 was written with a servo frame 11 for that track n−1, a portion 20 of the burst written for the second position field for that previous track n−1 overlapped onto the track n currently being written. This portion 20 is unwanted. Accordingly, at this point in the process, the write element 2 is used to erase that portion 20.

The read and write elements 1,2 are then stepped half a track pitch towards track n+1 (i.e. downwards in FIG. 2) and returned to the beginning of the servo frame 11 (i.e. to the left in FIG. 2). At this point, the read element 1 overlies a portion of the logic field 12 that was written previously to a previous track n−x, where x will depend on the geometry of the read and write head and the skew angle of the actuator supporting the head. Accordingly, as the read and write elements 1,2 are moved in the direction A, the read element 1 can read the logic field 12 of that previous track n−x. The data that is read out can be analysed, preferably substantially in real time on-the-fly, in order to verify that logic field 12 to ensure that the logic field 12 was validly written in the previous pass. (This analysis is preferably completed before it is necessary to begin analysing the next data that is read out.) This represents a significant difference to the conventional servo track writing process described above. In particular, in the conventional servo track writing process, owing to the small width of the write element, in the first pass only the upper half of the logic field is written to the track n and it is necessary to write the lower half in the second pass. It is this that has made it not possible previously to verify the logic field on-the-fly, i.e. without adding to the time spent in manufacturing the storage medium.

After the read element 1 has passed over and read the previously written logic field 12, the write element 2 reaches the beginning of the first position field 13' of track n. The write head 2 is used to erase that portion 21 that is in the lower half of the track n in FIG. 2 as that portion 21 is unwanted. (The write element 2 may also erase all or some of the portion of the first position field 13' that overlies the following track n+1.) The write element 2 is then used to write the second position field 13" in the lower half of track n in FIG. 2. Again, a part of the written second position field 13" overlaps onto the next track n+1.

The read and write elements 1,2 are then stepped downwards in FIG. 2 by a further half track and the process repeated to write the logic field 12 and first and second position fields 13',13" of a servo frame 11 for the next track n+1, erasing unwanted portions of previously written first and second position fields 13',13" as required and verifying the logic field 12 for a previously written track.

Accordingly, as can be seen, given that the entirety of the logic field 12 of a (previous) track is written in a first pass over the track, that logic field 12 can be read and therefore verified whilst the read and write elements 1,2 make a second pass over the track n towards the position where they erase the unwanted previously written portion 21 of the first position field 13' and write the second position field 13" for the track n. This interleaving of the writing of the position fields 13',13" of a servo frame 11 to a track of a storage medium 10 with reading of a previously written logic field 12 of a track of the storage medium 10 allows the entire logic field 12 to be verified without any increase in time required to write the servo frames 11 to the storage medium 10.

Whilst preferably the whole logic field 12 is read and verified, it may be necessary or desirable to read only a part, such as particularly the address mark 14.

A number of other advantages also follow. For example, given that the entire logic field 12 for a track is written in one pass, the logic field 12 is generally of better quality compared to those written in the conventional servo track writing process. In the conventional servo track writing process, as mentioned above, the logic field 12 of a servo frame is written in two halves in two passes over the track. This inevitably makes the process difficult and/or leads to gaps between the two halves and/or incoherence at the half track positions. Moreover, the write element 2 in this embodiment is writing for only just over half of the time required for writing in the conventional servo track writing process. This means that the power dissipation of the pre-amplifiers used to drive the write element 2 is approximately half that of the conventional process. This means that less heat is built up in the servo track writer, thus simplifying its manufacture and assembly and possibly allowing awkward heat sinks to be avoided.

In practice, each track of a storage medium, such as a disk, has several servo frames spaced around the track, the regions between the servo frames being data areas where user data is saved. As the disk 10 is rotated during the servo writing process and assuming by way of example that the servo frames 11 are written to tracks starting at the outside diameter and moving inwards, the plural servo frames 11 are written around a track n generally in the manner described above by first writing a logic field 12 for a first servo frame 11, followed by writing the first position field 13' and erasing any unwanted portion 20 of a second position field 13" of a previously written servo frame 11 on the preceding track n−1. The write element 2 then repeats this for the next and subsequent servo frames 11 on the same track n around the disk. Once the write element 2 is back to the start position, the read and write elements 1,2 are stepped inwards. The logic field 12 of the servo frame 11 of a previous track is read by the read element 1 and verified. The unwanted portion 21 of the first position field 13' of the current track is then erased and the second position field 13" written using the write element 2. The read and write elements 1,2 then move on until all servo frames 11 of the track n have been written and all servo frames 11 of the previous track have been read and verified. The read and write elements 1,2 are then stepped in again by a half track and the process repeated for the following track n+1 and subsequent tracks.

It has been described above how the read element 1 can read at least a portion of the logic field 12 of a previously written track whilst the write element 2 is moving towards the position where it writes the second position field 13" of a subsequent track, thereby allowing the (portion of the) logic fields 12 to be verified. It will be understood that this reading of the logic fields of tracks previous to the track currently being written depends on the geometrical arrangement of the read and write elements 1,2 in relation to the arrangement of the tracks on the storage medium 10. This will be discussed further below.

Moreover, the geometrical arrangement of the read and write elements 1,2 in relation to the arrangement of the tracks can be set such that the read element 1 is passing over and can therefore read at least a part and preferably the whole of the position field 13,13',13" of a previously written track whilst the write element 2 is moving towards the position where it writes the second half 13" of the position field 13 of the track currently being written. Thus, it is possible not only to read and preferably verify the logic fields 12 of the servo frames 11, but it is also possible to read the position fields 13 of the servo frames 11. Indeed, it can be arranged that only the position fields 13 are read, without reading and verifying the logic fields 12. Either way, this enables the position fields 13 to be verified and in particular demodulated. Demodulation of the position field 13 allows radial positional information to be captured in real time, providing a measure of the trajectory of the head relative to the storage medium 10. This trajectory will be affected by the dynamics of the system and the demodulation measures the error relative to a perfect track. This error can then be processed and fed back into the positioning system of the arm that supports the head to minimise this error in a manner known per se. It also aids optimisation of the seek/settle profile by feedback of the actual head position during the servo writing process. These features allow more accurate tracks to be formed on the storage medium, allowing the possibility of increasing the performance and hence the useful life of the media level writer.

The preferred geometrical arrangement of the read and write elements of the preferred embodiment will now be described with reference to FIG. 3, which shows schematically an example of an arrangement for writing servo frames to tracks on a disk 10 in accordance with an embodiment of the present invention. The disk 10 is mounted for rotation in a direction B about its centre. The read and write elements 1,2 of a media level writer are mounted on an arm (not shown) which pivots about a pivot point (not shown) in a manner known per se. Because the read and write elements 1,2 pivot about a pivot point, they are inevitably skewed at an angle $\theta$ relative to the tracks. As will be understood, the skew angle $\theta$ varies as the read and write elements 1,2 are pivoted across the disk from the outside diameter to the inside diameter during the servo writing process. This varying skew angle $\theta$ is taken into account when determining the offset $O_{RW}$ of the read and write heads 1,2.

Through simple geometry, it can be shown that the minimum required read write offset $O_{RW}$ for a typical maximum skew angle $\theta$ of the arm supporting the head is:

$$O_{RW} > S_{RW} \tan\theta + T_P \cos\theta$$

where, again:

$O_{RW}$=required read/write offset
$S_{RW}$=read/write separation
$T_P$=track pitch.

By way of example, where there are 100,000 tracks per inch, the track pitch is 0.25 microns. Typically, the read/write separation $S_{RW}$ is 4 microns. At the outside diameter, the maximum skew angle might be 18°. This gives a minimum required read/write offset $O_{RW}$ of 1.54 microns. Allowing say 20% tolerance, a preferred minimum read/write offset $O_{RW}$ is about 1.85 microns. The minimum width $W_W$ of the write element 2 is equal to the track pitch $T_P$, which in this example is 0.25 microns. Again allowing a tolerance of 20%, which also allows for the skew of the write head, the width $W_W$ of the write element 2 is preferably about 0.3 microns.

The maximum offset in number of tracks $N_T$ can be similarly calculated from the maximum skew angle in the opposite direction, which would typically be around 18 degrees, and is given by:

$$N_T = (O_{RW}/\tan\theta + S_{RW})\sin\theta/T_P$$

$$N_T = (5.66+4)*(0.31)/0.25$$

$$N_T = (9.66*0.31)/0.25$$

$$N_T = 12 \text{ tracks}$$

It will be appreciated that these values are given by way of example only.

In order to allow the position fields also to be read and therefore verified, the read/write separation $S_{RW}$ may be increased to around 14 microns. This in turn means that the required minimum read/write offset is about 5.11 microns. This can be seen by considering the example where a 100 MHz position field with 30 cycles of burst information on a disk spinning at 7200 rpm is used. This would equate to a position field of 300 nS. Allowing say 100 nS for switching from read to write gives a total of 400 nS. For a 3.5 inch (approx. 8.9 cm) disk, the linear velocity at the outside diameter would be around 34 m/sec (at 1.8 inch (approx. 4.6 cm) radius), resulting in a required relative separation of $34 \times 400 \times 10^{-9} = 14$ microns between the writer and reader.

The general concept described above of interleaving writing and reading of data can be extended to perform a so-called media certification of the data areas of the storage medium. As has been mentioned above, user data is stored on the storage medium in the regions between the servo frames 11 mentioned above. It is of course desirable to check the data areas for defects during the manufacturing process. Such defects may include for example physical defects in the disk surface, substrate defects, sputtering defects, mechanical scratches, etc. At present, storage media, such as disks, only have a portion of their data area checked or certified, leaving 75% or more of the data area unchecked.

Figure 4:
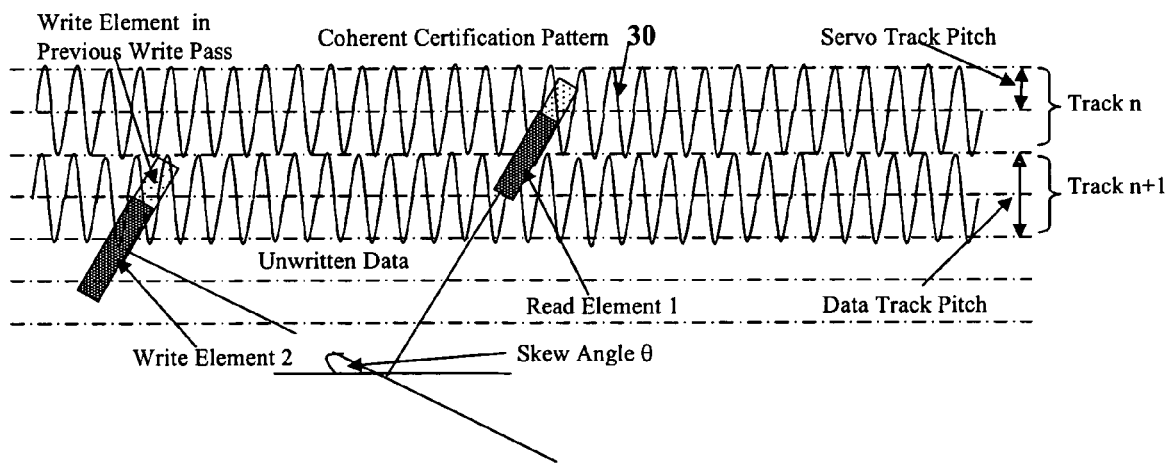

Thus, and referring now to FIG. 4, in an example, the write element 2 writes a coherent certification pattern 30 to a data area between servo frames of a track n. On the next revolution of the disk, the read and write elements 1,2 are moved inwards by half a track pitch. The read element 1 then reads certification data previously written to track n–x (again where x is dependent upon the skew angle of the actuator but will always be positive). The data that is read out can then be verified in order to allow that data area to be certified, i.e. to allow the integrity of that data area to be checked. By careful selection of the width of the read element 100% of the data area can be certified. For example if the read element is selected to have a width that is at least equal to the track pitch $T_P$ and the read-write offset $O_{RW}$ at maximum skew equates to at least one physical track pitch $T_P$, then 100% coverage is achievable. The read and write elements 1,2 are then stepped in again by a half track pitch and the process repeated for the next track n+1 and subsequent tracks.

Figure 3:
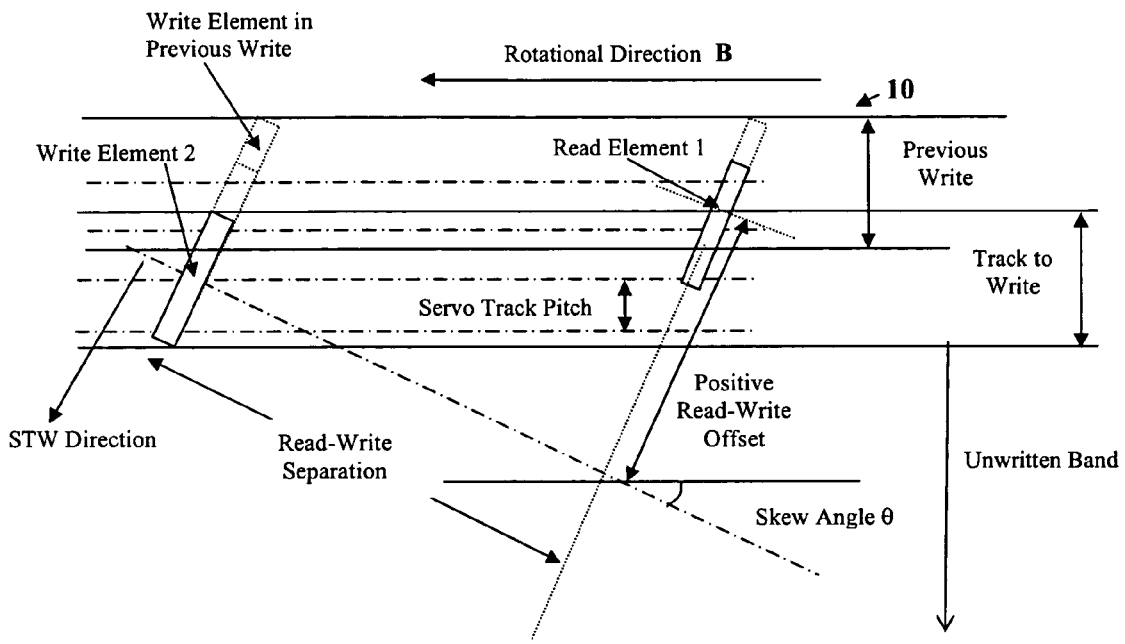
FIG. 3 is a schematic representation of an example of the writing of servo frames to a storage medium in accordance with an embodiment of the present invention, which is used to explain the preferred relationship between the skew and offset of read and write elements and the track pitch; and, FIG. 4 is a schematic representation of an example of the process of certification of the data area between servo frames in accordance with an embodiment of the present invention.

Whilst the servo writing process described generally above with reference to FIGS. 2 and 3 and the media certification process described generally above with reference to FIG. 4 may be performed independently in series, preferably the two processes are carried out in parallel in an interleaved manner. In other words, the preferred sequence may be generally as follows:

1. Start at outside diameter and write servo frames and certification patterns over for example the first 20 tracks. These first 20 or so tracks do not have their servo frames and certification patterns checked, but this is not important because they are in the so-called drive guard band that is close to the outside diameter end stop of the disk and which are therefore not used in practice in the assembled product. On the contrary, these first 20 or so tracks are used merely to "seed" the servo pattern and the certification pattern for subsequent tracks.

2. The write element is positioned over the whole of the next track and both a servo pattern and a certification pattern are written for all servo frames and data areas around the track.

3. The read and write elements are stepped in half a track. Moving around the servo frames and data areas, in sequence the logic field of a servo frame of a previous track is read and verified, the servo position fields of a servo frame of the current track are erased or written or rewritten as generally described above, and then the certification pattern of a data area of a previous track is read to allow it to be verified. Any defects can be logged. The read and write elements then move onto the next servo frames and data areas around the previous and current tracks.

4. The read and write elements are then stepped in again by half a track and the sequence repeated from step 2 until all tracks have been written. It will be understood that the last few tracks, say the last 20 or so, will not have been processed. However, again, these are in the drive guard band at the inner end stop of the assembled product and are therefore not used in the assembled product.

Again, preferably the position fields are also read and verified, as discussed above.

Accordingly, in the most preferred embodiment of the present invention, the logic fields and position fields of all servo frames and the data areas of all tracks (save for those in the inner and outer guard bands) are checked and validated on-the-fly during the servo writing process without any additional processing time being required. This allows 100% servo field verification and 100% data area certification, during the servo track write operation, with no time penalty. It avoids the need to provide a separate media certifier machine. Also, as has been mentioned above, the quality of the logic fields is improved as there are no gaps or incoherence at the half track positions. Power dissipation is or can be reduced owing to the reduced writing time required. Optimisation of the read-write separation ($S_{RW}$) allows reading of the whole logic field and preferably of the position field also. Optimisation of the read-write offset ($O_{RW}$) ensures that the read element is always lagging the write element. Optimisation of the read element width ensures that 100% coverage of the data area is achieved.

Embodiments of the present invention have been described with particular reference to the examples illustrated. However, it will be appreciated that variations and modifications may be made to the examples described within the scope of the present invention.

For example, in the preferred embodiment, all of the servo frames and all of the data areas (save for those in the guard bands) are checked. This requires that there be sufficient drive pre-amplifiers for the read and write heads and sufficient read and write channels in the media level writer. A cost saving may be made by for example having a smaller number of pre-amplifiers and/or channels and only correspondingly checking a sample of the servo frames and/or data areas.

Moreover, it will be understood that through the geometrical arrangement of the read and write elements of a media level writer, or other product with a rotary actuator, in which the read and write elements are pivoted across a disk, the number of tracks by which the read head effectively lags the write head will vary.

In a multi-channel media level writer, it is advantageous to interleave the read functions (i.e. certification, verification and demodulation) on one channel with writing the servo frame and certification data on another channel every half track. By this method, one certification/verification/demodulation channel can service two media level writer channels.

What is claimed is:

1. A method of writing servo frames to tracks of a storage medium using a write element of a head, each servo frame including a position field that is used to position a read element of the storage medium over the tracks and a logic field that provides a timing reference for the servo frame, the position field having at least a first portion and a second portion that is spaced laterally of the track from the first portion, the method comprising:

(A) positioning the write element over a track on the storage medium;

(B) writing a complete full width logic field of a servo frame to said track with the write element;

(C) writing a first portion of the position field of said servo frame to a first part of said track with the write element;

(D) moving the write element relative to the storage medium such that a second portion of said position field of said servo frame of said track can be written at a position that is at least spaced laterally of the track from said first portion;

(E) during the movement in step (D), reading at least a portion of at least one of (i) said logic field of said servo frame of said track and (ii) a logic field of a servo frame of another track, in order to allow said portion of the logic field to be verified;

(F) writing said second portion of said position field of said servo frame of said track at a position that is at least spaced laterally of the track from said first portion with the write element; and, (G) repeating steps (A) to (F) as required for subsequent tracks on the storage medium, said position fields and said logic fields of said servo frames providing references for locating data sectors.

2. A method according to claim 1, wherein step (D) comprises moving the write element relative to the storage medium both laterally of the track and longitudinally of the track, and wherein the reading in step (E) takes place during said longitudinal movement.

3. A method according to claim 1, comprising repeating steps (B) and (C) as required for further servo frames of said track prior to carrying out step (D) and then repeating steps (D) to (F) as required for said further servo frames.

4. A method according to claim 1, comprising carrying out steps. (A) to (G) for at least all tracks in a user data area of the storage medium.

5. A method according to claim 1, comprising reading a position field of a servo frame of another track whilst moving the write element in step (D).

6. A method according to claim 5, wherein the position field is demodulated to provide a position error signal that is used to control the movement of the head.

7. A method according to claim 5, wherein the position fields of at least all tracks in a user data area of the storage medium are read.

8. Apparatus for writing servo frames to tracks of a storage medium, each servo frame including a position field that is used to position a read element of the storage medium over the tracks and a logic field that provides a timing reference for the servo frame, the position field having at least a first portion and a second portion that is spaced laterally of the track from the first portion, the apparatus comprising:

a multi-element head having at least one write element and at least one read element that are offset from each other, the write element having a width that is greater than the pitch of the tracks on said storage medium;

the apparatus being arranged such that the write element can be positioned over a track on the storage medium; such that a complete full width logic field of a servo frame can be written to said track with the write element; such that a first portion of the position field of said servo frame can be written to a first part of said track with the write element; such that the write element can be moved relative to the storage medium such that a second portion of said position field of said servo frame of said track can be written at a position that is at least spaced laterally of the track from said first portion; such that, during the movement of the write element as aforesaid, a portion of at least one of (i) said logic field of said servo frame of said track and (ii) a logic field of a servo frame of another track can be read by the read element, in order to allow said portion of the logic field to be verified; and such that said second portion of said position field of said servo frame of said track can be written at a position that is at least spaced laterally of the track from said first portion with the write element, said position fields and said logic fields of said servo frames providing references for locating data sectors.

9. Apparatus according to claim 8, wherein the apparatus is arranged such that during said movement, the write element moves relative to the storage medium both laterally of the track and longitudinally of the track, and such that said reading of said logic field takes place during said longitudinal movement.

10. Apparatus according to claim 8, the apparatus being arranged such that a position field of a servo frame of a track is read during. the servo writing process.

11. Apparatus according to claim 10, the apparatus being arranged such that the position field is demodulated to provide a position error signal that is used to control the movement of the head.

12. Apparatus according to claim 10, the apparatus being arranged such that the position fields of at least. all tracks in a user data area of the storage medium are read during the servo writing process.

13. A method of writing servo frames to and verifying data areas of tracks of a storage medium using a write element and a read element of a head, each servo frame including a position field that is used to position a read element of the storage medium over the tracks and a logic field that provides a timing reference for the servo frame, the method comprising:

(A) positioning the write element over substantially the whole of a track on the storage medium;

(B) writing a complete full width logic field of a servo frame to said track with the write element;

(C) writing a first portion of the position field of said servo frame to said track with the write element;

(D) writing a certification pattern to a data area of said track with the write element;

(E) moving the write element relative to the storage medium to a position over said track such that a second portion of said position field of said servo frame of said track can be written at a position that is at least spaced laterally of the track from said first portion;

(F) during the movement in step (E), reading a portion of at least one of (i) said logic field of said servo frame of said track and (ii) a logic field of a servo frame of another track, in order to allow said portion of the logic field to be verified;

(G) writing said second portion of said position field of said servo frame of said track at a position that is at least spaced laterally of the track from said first position with the write element;

(H) reading at least a portion of said certification pattern using the read element in order to allow the integrity of said data area to be checked; and (I) repeating steps (A) to (H) as required for subsequent tracks on the storage medium, said position fields and said logic fields of said servo frames providing references for locating data sectors.

14. A method according to claim 13, wherein said previously written logic field is written in a first pass of the head over the storage medium and is read in a second pass of the head over the storage medium.

15. A method according to claim 14, wherein a first portion of said position field is written in said first pass of the head over the storage medium and a second portion of said position field is written in said second pass of the head over the storage medium.

16. A method according to claim 13, wherein at least a portion of the logic fields of the servo frames of all tracks in a user data area of the storage medium are read during the servo writing process to allow said portions to be verified.

17. A method according to claim 13, comprising reading a position field of a servo frame of a track during the servo writing process.

18. A method according to claim 17, wherein the position field is demodulated to provide a position error signal that is used to control the movement of the head.

19. A method according to claim 17, wherein the position fields of at least all tracks in a user data area of the storage medium are read during the servo writing process.

20. Apparatus for writing servo frames to and verifying data areas of tracks of a storage medium, each servo frame including a position field that is used to position a read element of the storage medium over the tracks and a logic field that provides a timing reference for the servo frame, the apparatus comprising:

a multi-element head having at least one write element and at least one read element that are offset from each other, the write element having a width that is greater than the pitch of the tracks on a said storage medium;

the apparatus being arranged such that the write element can be positioned over substantially the whole of a track on the storage medium; such that a complete full width logic field of a servo frame is written to said track with the write element; such that a first portion of the position field of said servo frame is written to said track with the write element; such that a certification pattern is written to a data area of said track with the write element; such that the write element can be moved relative to the storage medium to a position over said track such that a second portion of said position field of said servo frame of said track can be written at a position that is at least spaced laterally of the track from said first portion; such that during the movement as aforesaid, a portion of at least one of (i) said logic field of said servo frame of said track and (ii) a logic field of a servo frame of another track can be read by the read element, in order to allow said portion of the logic field to be verified; such that said second portion of said position field of said servo frame of said track is written at a position that is at least spaced laterally of the track from said first position with the write element; and such that at least a portion of said certification pattern is read using the read element in order to allow the integrity of said data area to be checked, said position fields and said logic fields of said servo frames providing references for locating data sectors.

21. Apparatus according to claim 20, the apparatus being arranged such that a position field of a servo frame of a track is read during the servo writing process.

22. Apparatus according to claim 21, the apparatus being arranged such that the position field is demodulated to provide a position error signal that is used to control the movement of the head.

* * * * *